United States Patent
Chien et al.

(10) Patent No.: US 9,131,075 B1
(45) Date of Patent: Sep. 8, 2015

(54) PRINTING SYSTEM AND OPERATING METHOD THEREOF

(71) Applicant: HiTi Digital, Inc., New Taipei (TW)

(72) Inventors: Chia-Wei Chien, New Taipei (TW); Hong-Shun Chiou, New Taipei (TW)

(73) Assignee: HITI DIGITAL, INC., New Taipei (TW)

( * ) Notice: Subject to any disclaimer, the term of this patent is extended or adjusted under 35 U.S.C. 154(b) by 0 days.

(21) Appl. No.: 14/542,884

(22) Filed: Nov. 17, 2014

(30) Foreign Application Priority Data

Sep. 11, 2014 (TW) .............................. 103131401 A

(51) Int. Cl.
*H04N 1/00* (2006.01)
*H04L 29/06* (2006.01)

(52) U.S. Cl.
CPC .......... *H04N 1/00108* (2013.01); *H04L 63/083* (2013.01)

(58) Field of Classification Search
USPC .......................................... 358/1.1
See application file for complete search history.

(56) References Cited

U.S. PATENT DOCUMENTS

2013/0268401 A1* 10/2013 Choi et al. ............... 705/26.8
2014/0368865 A1* 12/2014 Gutnik et al. ............ 358/1.15

* cited by examiner

*Primary Examiner* — Ngon Nguyen
(74) *Attorney, Agent, or Firm* — McClure, Qualey & Rodack, LLP

(57) ABSTRACT

A printing system and operating method thereof are disclosed herein. The printing system includes a server device, an electronic device and a wireless printing device. The wireless printing device includes a network module and a printing module. The server device includes a storage position. The electronic device is configured to transmit print data to the storage position of the server device. The network module is configured to receive the print data transmitted from the server device. The printing module is configured to print the print data received by the network module.

10 Claims, 7 Drawing Sheets

PRINTING SYSTEM AND OPERATING METHOD THEREOF

RELATED APPLICATIONS

This application claims priority to Taiwan Application Serial Number 103131401, filed Sep. 11, 2014, which is herein incorporated by reference.

BACKGROUND

1. Field of Invention

The present disclosure relates to a printing device. More particularly, the present disclosure relates to a printing device equipped with a mobile wireless network function.

2. Description of Related Art

Due to the great advancement in technology related to wireless communications in recent years, wired communications technology is being faded out in applications that do not require a high transmission speed. For example, transmission related to computer peripheral equipment, such as pointing devices, keyboards, speakers, and printers, is increasingly taking place using wireless techniques.

Regarding the printer, a traditional wired printer normally receives data from a personal computer (PC) through a USB (Universal Serial Bus) or Ethernet connection. However, modern printers may even receive data through a wireless network, e.g., Wi-Fi and Bluetooth.

However, the transmission distance of Wi-Fi and Bluetooth is still limited, and wireless networks that provide the largest transmission distance and widest coverage are mobile networks. Therefore, an unaddressed need exists in the art to combine the advantages of a mobile wireless network and a printer.

SUMMARY

An aspect of the present disclosure provides a printing system. The printing system comprises a server device, an electronic device and a wireless printing device. The wireless printing device includes a network module and a printing module. The server device includes a storage position. The electronic device is configured to transmit print data to the storage position of the server device through a mobile wireless network. The network module is configured to receive the print data transmitted by the server device through a mobile wireless network. The printing module is configured to print the print data received by the network module.

Another aspect of the present disclosure provides a printing method applied in a printing system. The printing system includes a server device and a wireless printing device, in which the printing method includes the following steps: transmitting print data to a storage position of the server device; and pushing the print data of the storage position to the wireless printing device by the server device, in which the wireless printing device receives the print data through a mobile wireless network.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
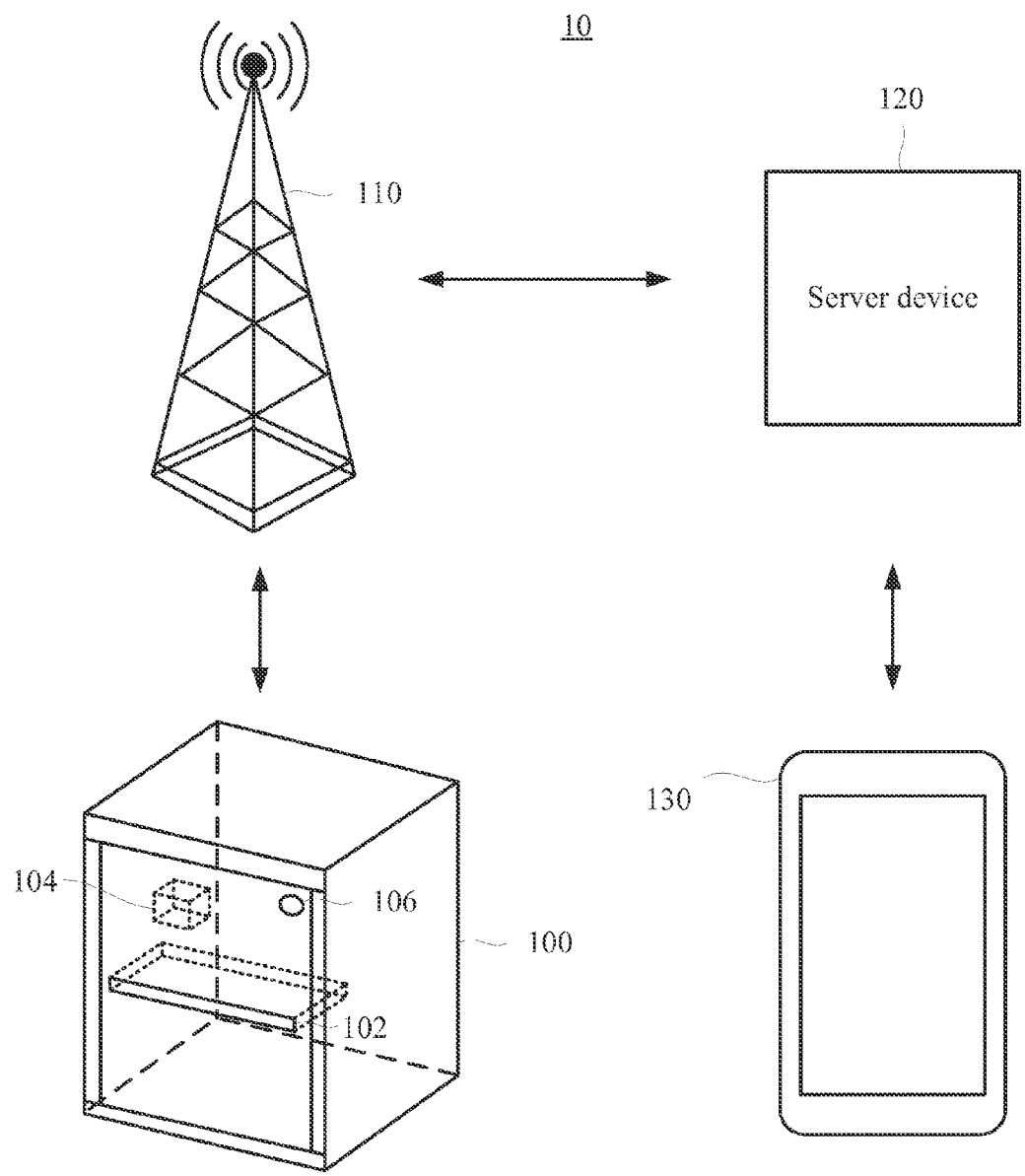
FIG. 1 is a schematic diagram illustrating a printing system according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that although the terms "first," "second," "third," etc. may be used herein to describe various elements, these elements should not be limited by these terms. These terms are only used to distinguish one element from another element. Thus, a "first element" discussed below could be termed a "second element" without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring to FIG. 1, a schematic diagram illustrating a printing system 10 according to one embodiment of the disclosure is presented. The printing system 10 includes a wireless printing device 100, a wireless base station 110, a server device 120 and an electronic device 130. In the printing system 10, the wireless printing device 100 prints data stored in the electronic device 130.

The wireless printing device 100 includes a printing module 102 and a network module 104. The printing module 102 is configured to print data which may be text or images. The network module 104 is configured to communicate with the wireless base station 110 through a mobile wireless network. In other words, the network module 104 is configured to transmit/receive wireless signals to/from the wireless base station 110. In addition, the wireless printing device 100 further includes a switch 106 configured to determine a power status of the wireless printing device 100. It is noted that the printing module 102 performs a printing operation in response to a data signal received by the network module 104.

Figure 2:
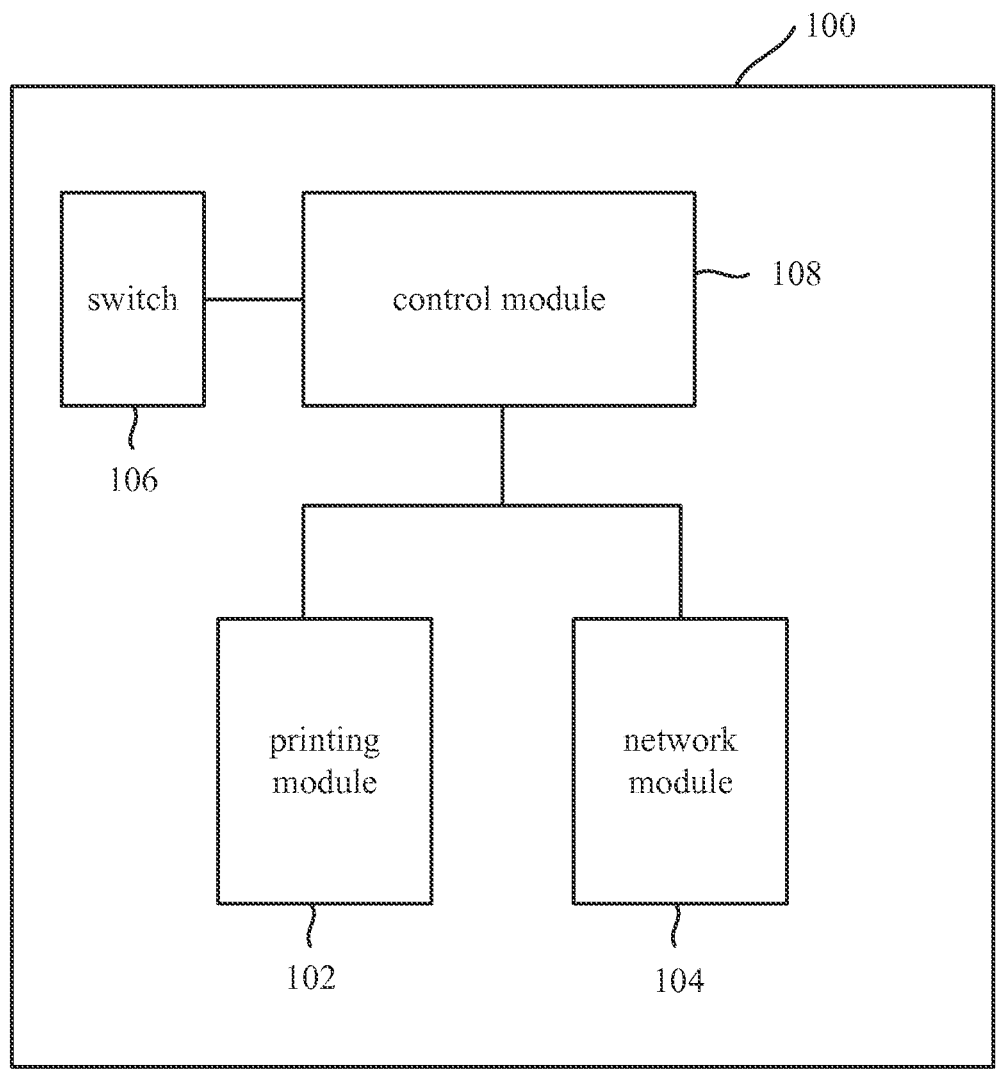
FIG. 2 is a block diagram illustrating a wireless printing device according to one embodiment of the disclosure.

Reference is made also to FIG. 2, which is a block diagram illustrating a wireless printing device 100 according to one embodiment of the disclosure is presented. Compared to the wireless printing device 100 of FIG. 1, the wireless printing device 100 of FIG. 2 further includes a control module 108, in which the control module 108 is electrically coupled to the printing module 102, the network module 104 and the switch 106.

The printing module 102 is electrically coupled to the network module 104, in which the printing module 102 is configured to perform a printing operation in response to data received by the network module 104 from the wireless base station 110. The printing module 102 may directly receive the data received by the network module 104, or the printing module 102 may indirectly receive the data received by the network module 104 through the control module 108.

The network module 104 is configured to connect to the wireless base station 110 though a mobile wireless network and to transmit or receive control signals and data signals. In some embodiments, the mobile wireless network may be a TDMA-, CDMA-, or OFDMA-based mobile wireless network.

The switch 106 is configured to transmit a power control signal to the control module 108, and the control module 108 determines the power status of the wireless printing device 100 according to the power control signal.

The control module 108 is configured to transmit control signals and data signals to the printing module 102 and to the network module 104. The control module is configured to receive control signals and data signals from the printing module 102 and the network module 104.

The wireless base station 110 is configured to connect to the wireless printing device 100 through the mobile wireless network, and the wireless base station 110 is also configured to receive data transmitted by the server device 120.

The server device 120 is configured to receive data transmitted by the electronic device 130 and to push the data transmitted by the electronic device 130 to the wireless printing device 100. It should be noted that the server device 120 includes a storage position corresponding to the wireless printing device 100.

In some embodiments, the server device 120 may be a cloud server device, a mail server device or a file transfer protocol (FTP) server device.

The electronic device 130 is configured to enable a user to transmit print data to the server device 120. It should be noted that the server device 120 pushes the print data to the wireless printing device 100 corresponding to the storage position when the electronic device 130 transmits the print data to the storage position of the server device 120.

In some embodiments, the wireless printing device 100 periodically or continually connects to the server device 120. When the corresponding storage position has print data, and the wireless printing device 100 connects to the server device 120, the server device 120 pushes the print data stored in the storage position to the wireless printing device 100 through the wireless base station 110.

In some embodiments, the electronic device 130 may be a cell phone, a tablet computer, a wearable device, a mobile device, a personal computer or a notebook.

Figure 3:
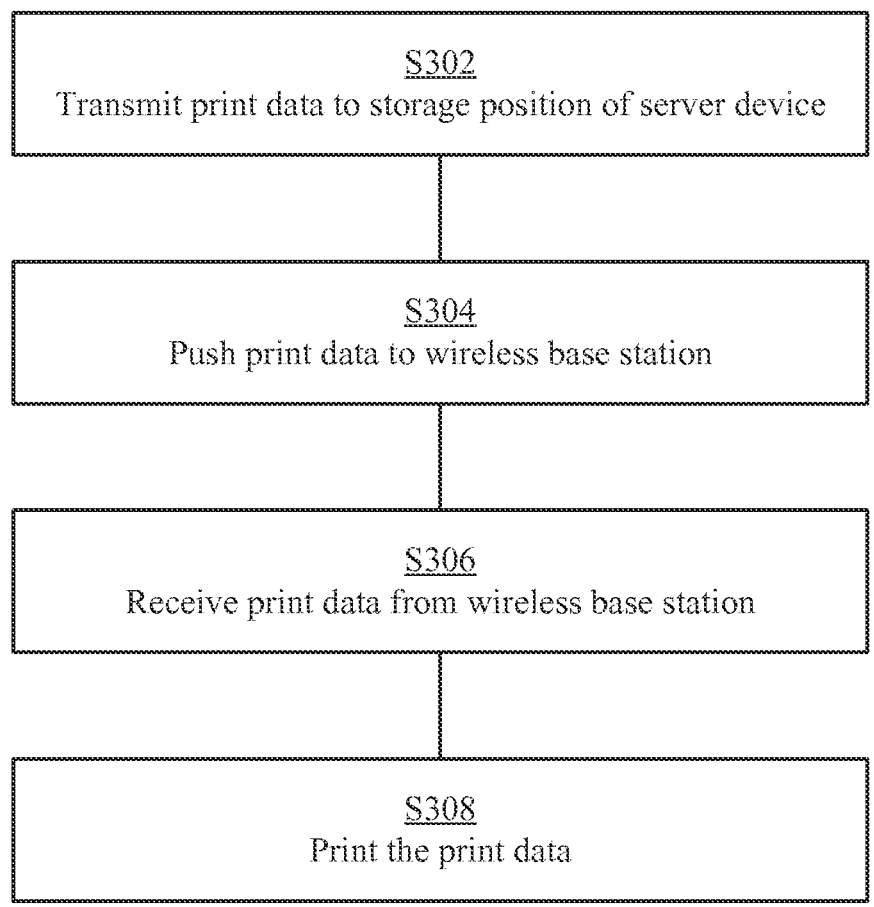
FIG. 3 is a flow diagram illustrating an operating method according to one embodiment of the disclosure.

Reference is made to FIG. 3 in order to illustrate an operating method 300 of the printing system 10. FIG. 3 is a flow diagram illustrating an operating method according to one embodiment of the disclosure.

First of all, in step S302, the electronic device 130 is configured to transmit print data to a storage position of the server device 120, in which the storage position corresponds to a specific wireless printing device 100.

In step S304, the server device 120 pushes the print data to the wireless base station 110 connected to the wireless printing device 100.

In some embodiments, the wireless printing device 100 periodically connects to the server device 120. If the corresponding storage position has the print data, and the wireless printing device 100 is connected to the server device 120, the server device 120 pushes the print data of the storage position to the wireless base station 110.

In step S306, the wireless printing device 100 receives the print data through the mobile wireless network.

In step S308, the wireless printing device 100 prints the print data.

As described above, the printing system 10 and the operating method thereof utilize the advantages of the mobile wireless network (i.e., large transmission distance and wide coverage) so as to let the user print data using a data route which is different from traditional routes.

Figure 4:
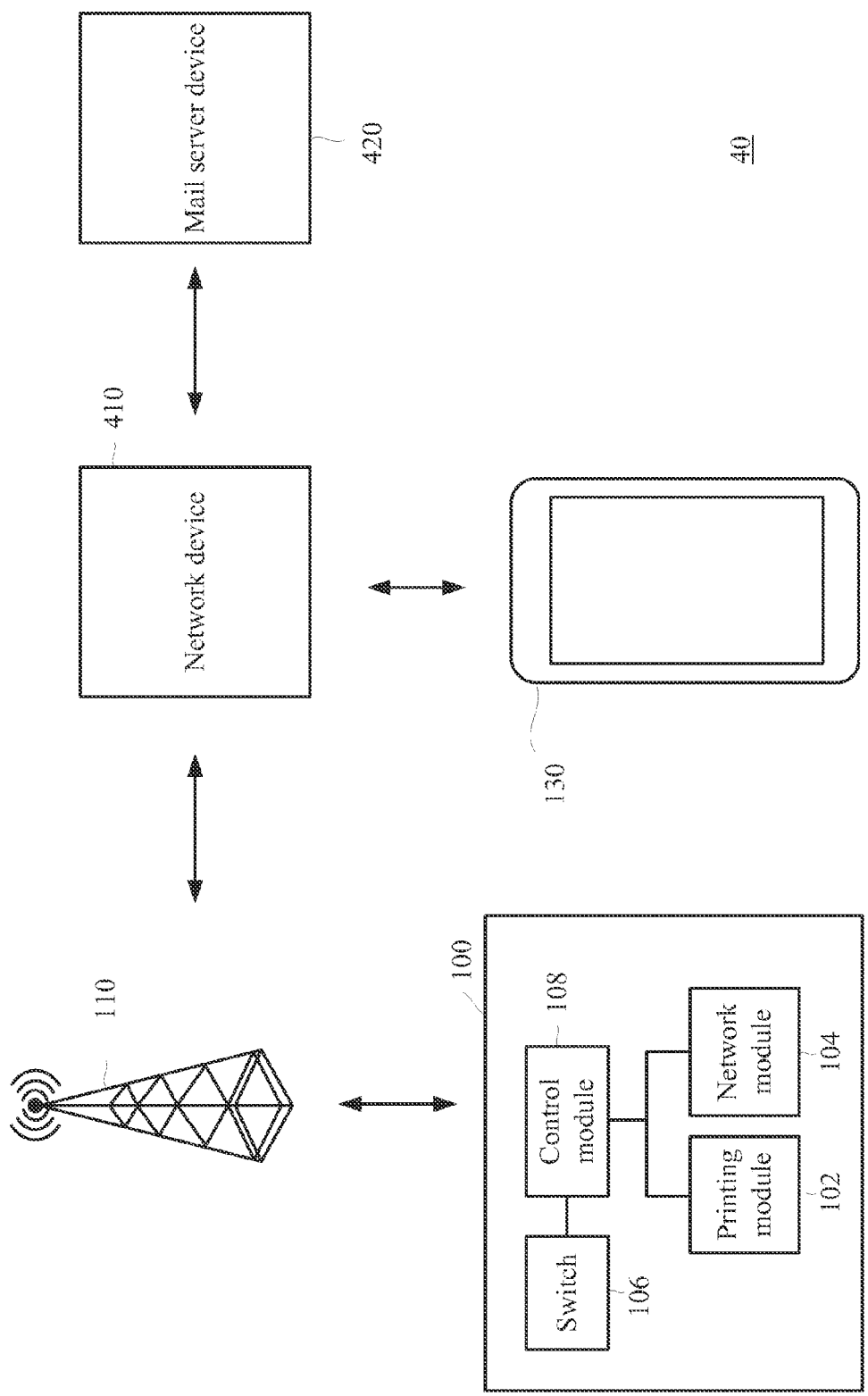
FIG. 4 is a schematic diagram illustrating a printing system according to one embodiment of the disclosure.

Referring to FIG. 4, a schematic diagram illustrating a printing system 40 according to one embodiment of the disclosure is presented. The server device 120 of the printing system 10 of FIG. 1 corresponds to a mail server device 420 of the printing system 40 in the embodiment of FIG. 4. The printing system 40 further includes a network device 410 to specify details of the connecting relationship between each device. In more detail, the network device 410 is configured to connect to the mail server device 420, the electronic device 130 and the wireless base station 110.

In some embodiments, the network device 410 includes modules required for switching between different networks. For example, if the electronic device 130 connects to a wireless access point (AP) through a Wi-Fi network, the wireless AP connects to the mail server device 420 through an Ethernet network. The mail server device 420 connects to the wireless base station 110 utilizing the Ethernet network and wired network provided by telecom companies. The network device 410 includes the mentioned wireless AP, the wired network provided by the telecom companies and required modules for the Ethernet network.

The mail server device 420 includes at least one storage position, in which each storage position corresponds to an email address and a password. When the mail server device 420 receives emails corresponding to an email address, the mail server device 420 stores the emails to the storage position corresponding to the email address. Subsequently, the mail server device 420 pushes the content of the emails to the wireless printing device 100, in which the password is configured to let the wireless printing device 100 connect to the mail server device 420.

In some embodiments, the content of the email includes an attachment and a message body.

In some embodiments, the control module 108 of the wireless printing device 100 is able to determine whether content of the email is printable data. If yes, the printing module 102 prints out the content of the email. If not, the control module 108 displays an error message on a display module (not shown) of the wireless printing device 100, or the control module 108 transmits the error message to the mail server device 420 or to the electronic device 130 through the network module 104 such that the user can acknowledge the error message that the email is not printable.

In some embodiments, when the mail server device 420 receives the error message, the user may receive the error message transmitted by the mail server device 420.

In some embodiments, the wireless printing device 100 periodically or continually connects to the mail server device 420 using the email address and the password. If the corresponding storage device has the print data, and the wireless printing device 100 connects to the mail server device 420, the mail server device 420 pushes the print data stored in the storage position to the wireless printing device 1000.

In some embodiments, the email address may be viewed as a receiver email address.

In some embodiments, each storage position of the mail server device 420 further corresponds to at least one predetermined sender email address. If the sender email address of the email does not match each predetermined sender email address, the mail sever device 420 blocks the email.

In some embodiments, each storage position of the mail server device 420 further includes another password. The another password is utilized when the user would like to print data. For example, when the user transmits print data, the another password is required to be in the email so as to transmit the email to the corresponding storage position.

Figure 5:
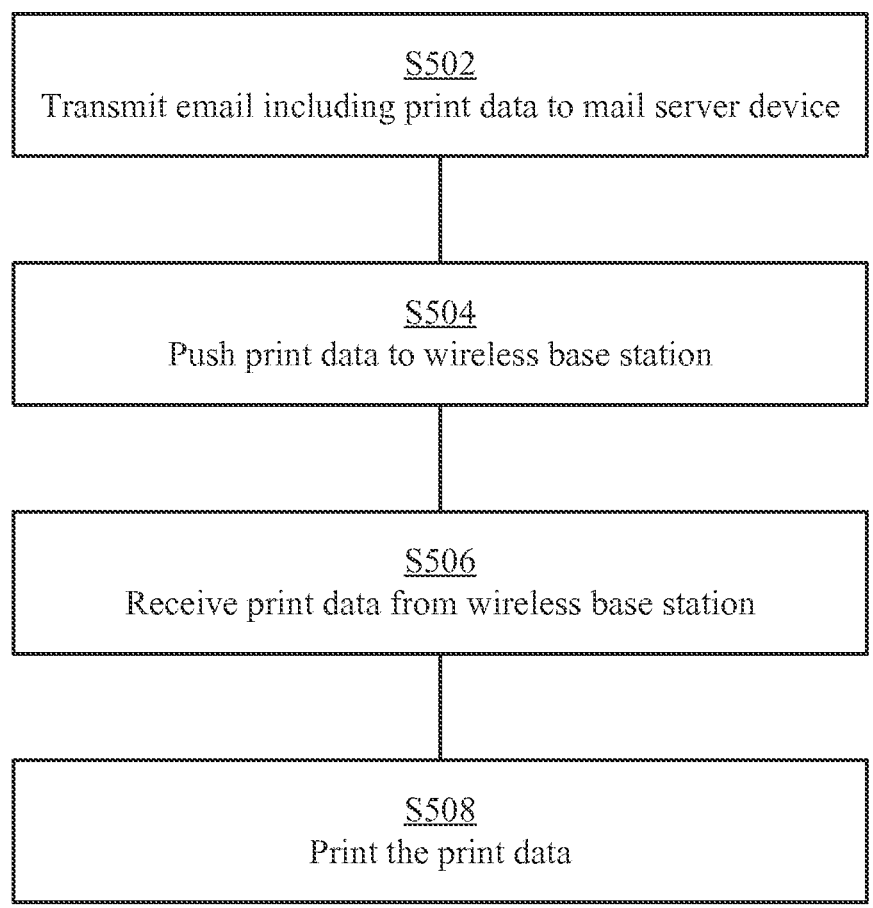
FIG. 5 is a flow diagram illustrating an operating method according to one embodiment of the disclosure.

Reference is made to FIG. 5 to describe the operating method 500 of the printing system 40. FIG. 5 illustrates a flow diagram of the operating method 500 according to one embodiment of the disclosure.

First of all, in step S502, the electronic device 130 is configured to transmit an email including print data to the mail server device 420 through the network device 410. The mail server device 420 stores the email in a storage position according to the receiver email address.

In step S504, the mail server device 420 pushes print data to the wireless based station 110 which is connected to the wireless printing device 100.

In some embodiments, the mail server device 420 pushes the print data included in the email to the wireless base station 110 which is connected to the wireless printing device 100.

In some embodiments, the wireless printing device 100 periodically or continually connects to the mail server device 420. If the corresponding storage position has the print data, and the wireless printing device 100 connects to the mail server device 420, the mail server device 420 pushes the print data stored in the storage position to the wireless base station 110.

In step S506, the wireless printing device 100 receives the print data from the wireless base station 110 through the mobile wireless network.

In step S508, the wireless printing device 100 prints the print data.

Figure 6:
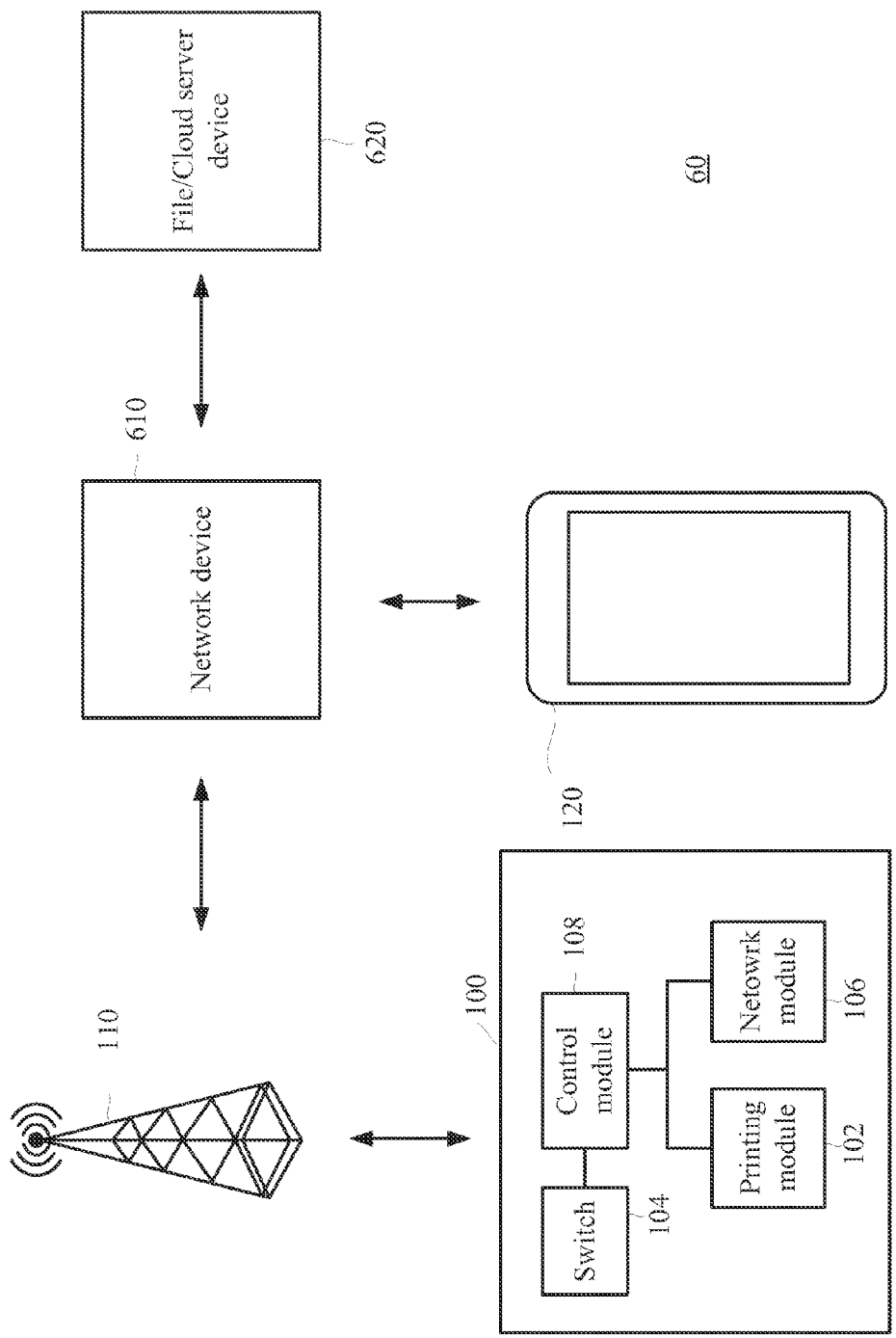
FIG. 6 is a schematic diagram illustrating a printing system according to one embodiment of the disclosure.

Reference is now made to FIG. 6, which is a schematic diagram illustrating a printing system 60 according to one embodiment of the disclosure. The server device 120 of the printing system 10 of FIG. 1 corresponds to a file transfer protocol (FTP) server device 620 of the printing system 60 in the embodiment of FIG. 6. The printing system 60 further includes a network device 610 to specify details of the connection relationship between each device. In more detail, the network device 610 is configured to connect to the file transfer server 620, an electronic device 130 and a wireless base station 110.

In some embodiments, the FTP server device 620 may also be a cloud server device.

The FTP server device 620 includes at least one storage position, in which each storage position corresponds to a username and a password. When the FTP server device 620 acknowledges that the storage position corresponding to a username includes a newly added file, the FTP server device 620 pushes the new file to the wireless printing device 100, in which the password corresponds to the username, and the password is configured as a password for the electronic device 130 to login to the FTP server device 620.

In some embodiments, the wireless printing device 100 maintains the connection to the FTP server device 620 through at least one user name. If the corresponding storage position has the newly added print data, the data transfer server device 620 pushes the print data of the storage device to the wireless printing device 100.

In some embodiments, each storage position of the FTP server device 620 contains another password, and the another password is configured as a password for the wireless printing device 100 to login to the FTP server device 620.

Figure 7:
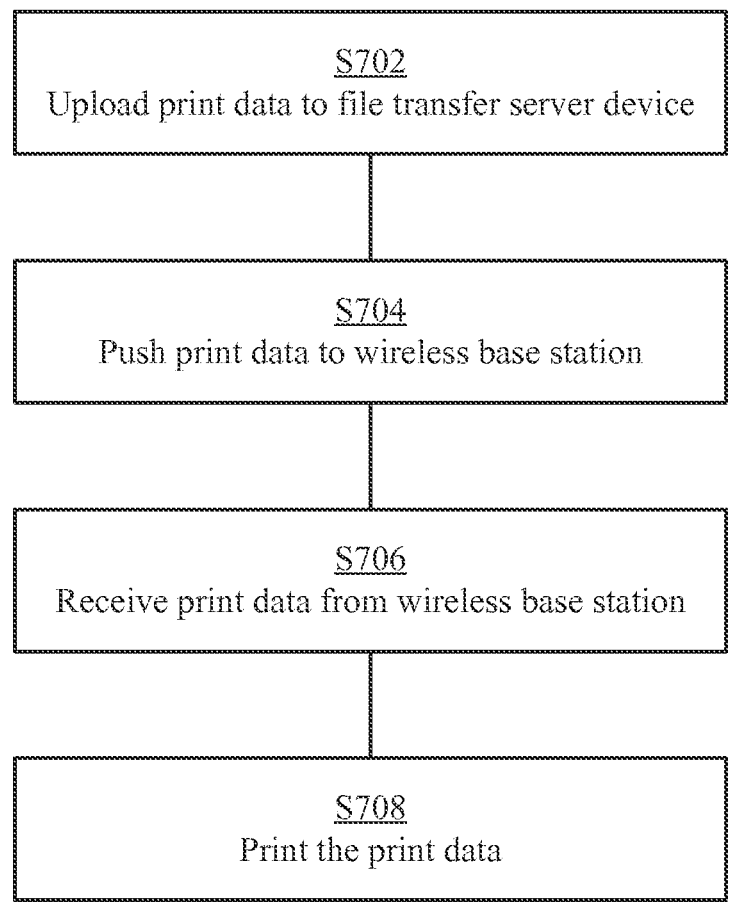
FIG. 7 is a flow diagram illustrating an operating method according to one embodiment of the disclosure.

Reference is made to FIG. 7 so as to illustrate an operating method 700 of the printing system 60. FIG. 7 is a flow diagram illustrating the operation method 700 of the printing system 60 according to one embodiment of the disclosure.

First, in step S702, the electronic device 130 is configured to upload print data to the FTP server device 620 though the network device 610, in which the FTP server device 620 stores the print data to the corresponding storage position according to the username.

In step S704, the FTP server device 620 pushes the email to the wireless bases station 110 connected to the wireless printing device 100.

In some embodiments, the wireless printing device 100 maintains the connection to the FTP server device 620 based on at least one username. If the corresponding storage position has newly added print data, the FTP server device 620 pushes the newly added data to the wireless base station which is connected to the wireless printing device 100.

In step S706, the wireless printing device 100 receives newly added print data from the wireless base station 110 through the mobile wireless network.

In step S708, the wireless printing device 100 prints the received print data.

As described above, the printing systems and the operating method thereof of the present disclosure let the user print data in a data route which is different from traditional data routes. Also, the printing systems and the operating methods thereof of the present disclosure make the transmission of the print data more diversified.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present disclosure cover modifications and variations of this invention provided they fall within the scope of the following claims.

What is claimed is:

1. A printing system, comprising:
    a server device, comprising a storage position, wherein the server device is a mail server device, and the storage position corresponds to an email address;
    an electronic device, configured to transmit print data to the storage position of the mail server device through an email having the email address; and
    a wireless printing device, comprising:
    a network module, configured to connect to a wireless base station through a mobile wireless network; and
    a printing module, in response to the print data pushed by the server device being received through the mobile wireless network, the printing module being configured to print the print data.

2. The printing system of claim 1, wherein the mail server device further comprises a password corresponding to the email address, in which the wireless printing device uses the email address and the password to connect to the mail server device.

3. The printing system of claim 1, wherein the mail server device further comprises at least one predetermined sender email address corresponding to the email address, and the mail server device blocks the email when a sender email address is different from each of the predetermined email address.

4. The printing system of claim 1, wherein the wireless printing device periodically or continuously connects to the server device, and the server device transmits the print data of the storage position to the wireless printing device when the storage position has the print data.

5. The printing system of claim 1, wherein the mobile wireless network is a TDMA-, CDMA- or OFDMA-based mobile wireless network.

6. An operating method, applied in a printing system comprising a server device and a wireless printing device, wherein the server device is a mail server device, wherein the operating method comprises:
- transmitting a print data to a storage position of the mail server device through an email comprising an email address, wherein the storage position corresponds to the email address;
- pushing the print data of the storage position to the wireless printing device by the server device, wherein the wireless printing device receives the print data through a mobile wireless network; and
- printing the print data.

7. The operating method of claim 6, wherein the mail server device further comprises a first password corresponding to the email address, wherein the step of pushing the print data stored in the storage position further comprises:
- connecting to the mail server device by the wireless printing device using the first password; and
- pushing the print data of the storage position to the wireless printing device by the mail server device.

8. The operating method of claim 6, wherein the mail server device further comprises at least one predetermined sender email address corresponding to the email address, and the step of transmitting the print data to the mail server device further comprises:
- blocking the email by the mail server device when a sender email address of the email is different from each predetermined email address.

9. The operating method of claim 6, wherein the step of transmitting the print data of the storage position further comprises:
- connecting to the server device periodically or continuously;
- transmitting the print data of the storage position to the wireless printing device by the server device when the storage position has the print data.

10. The operating method of claim 6, wherein the mobile wireless network is a TDMA-, CDMA- or OFDMA-based mobile wireless network.

* * * * *